Oct. 15, 1935.   P. L. CRITTENDEN   2,017,684
FLUID COMPRESSOR
Filed Oct. 31, 1933
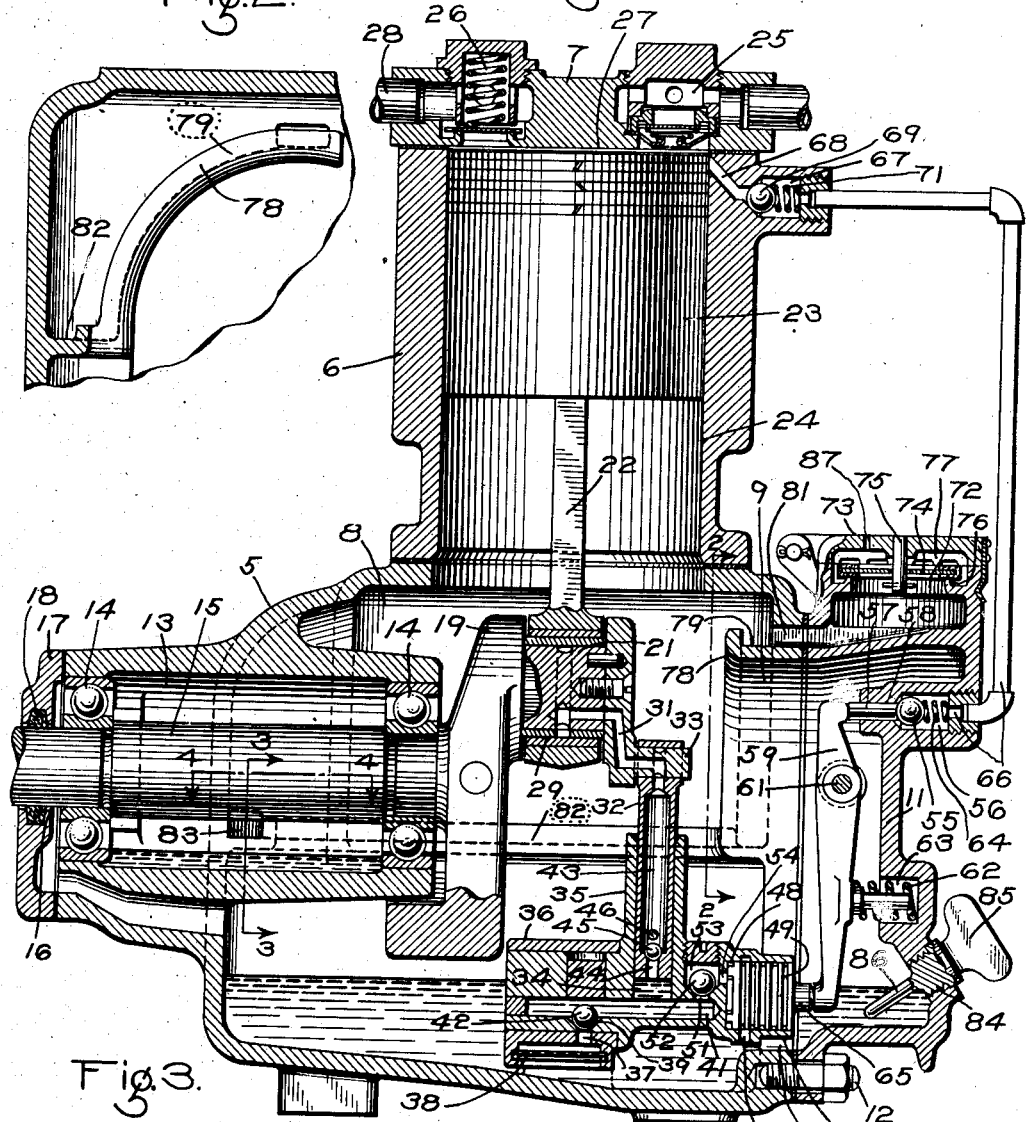
INVENTOR
PHILIP L. CRITTENDEN
BY   *Wm. M. Cady*
ATTORNEY Patented Oct. 15, 1935

2,017,684

UNITED STATES PATENT OFFICE 2,017,684

FLUID COMPRESSOR

Philip L. Crittenden, Edgewood, Pa., assignor to The Westinghouse Air Brake Company, Wilmerding, Pa., a corporation of Pennsylvania Application October 31, 1933, Serial No. 695,995

12 Claims. (Cl. 230—27)

This invention relates to fluid compressors and particularly to the lubricating and unloading devices for fluid compressors.

An object of the invention is to provide an improved lubricating system for the compressor and a fluid pressure controlled unloader device that is responsive to variations in the pressure of the fluid lubricant of said system for effecting unloading of the compressor when the lubricant pressure is low, as when the compressor is at rest or as when the lubricating system fails, and to effect loading of the compressor only when the lubricant pressure is increased to a predetermined value, as when the compressor has attained a predetermined speed of operation suitable for assuming the load.

A further object of the invention is to provide a fluid lubricant pressure controlled loading device having the above noted characteristics and having an unloading valve remote from the compression cylinder and wherein means are provided for minimizing the clearance of the unloading device.

A further object of the invention is to provide a combined lubricating and unloading device for a compressor that is readily accessible through removal of a single portion of the crank case.

A further object of the invention is to provide an improved crank case construction for a compressor, whereby fluid lubricant is conveyed by gravity from the filling opening to the crank shaft bearing through open channels that may be readily be formed with a simple core construction when the crank case is being cast.

These and other objects that will be made apparent throughout the further description of the invention are attained by means of the compressor construction hereinafter described and illustrated in the accompanying drawing; wherein Fig. 1 is a vertical sectional view through a single stage compressor embodying features of the invention;

Fig. 2 is a section through a fragment of the crank case, taken on the line 2—2 of Fig. 1;

Fig. 3 is a section through a fragment of the crank case, taken on the line 3—3 of Fig. 1, and Fig. 4 is a section through a fragment of the crank case, taken on the line 4—4 of Fig. 1.

Referring to the drawing, the compressor comprises a sectional casing consisting of a crank case 5, a cylinder section 6 and a cylinder head section 7, the casing section 5 being provided with a crank chamber 8 having a relatively large end opening 9 that is closed by a closure casing 11 which is secured to the casing 5 by means of bolts 12, one of which is shown. The casing section 5 is provided with a cylindrical bearing chamber 13 in which anti-friction bearings 14 are secured for supporting the rotatable crank shaft 15 which extends exteriorly of the casing through an opening 16 in a closure member 17 that is secured to the casing by means of bolts, not shown. A packing ring 18 in the closure member 17 serves to seal the space between the closure member and the crank shaft and prevent lubricant from flowing exteriorly of the casing. The compressor may be driven by any form of motor device, such as an electric motor or an internal combustion engine that is connected to the crank shaft 15.

The crank shaft 15 is provided with a counterbalanced crank arm 19 having a crank pin 21 to which the connecting rod 22 of a compression piston 23 is connected in the usual manner, so that as the crank shaft is rotated the piston 23 is reciprocated within the bore 24 of the cylinder casing 6 in the well known manner.

As in the usual single stage compressor, the head section 7 is provided with an intake valve device 25 and a discharge valve device 26, it being understood that when the piston is moved downwardly within the cylinder, air is drawn into the compression chamber 27 at the upper end of the piston through the inlet valve device 25 and when the piston is moved upwardly, the air taken in through the inlet valve 25 is compressed, the inlet valve 25 having closed upon initial upward movement of the piston in the compression stroke, and when the pressure within the chamber 27 becomes higher than the pressure within the receiver which is connected to the discharge valve device 26 through a pipe 28, the discharge valve device 26 is caused to open and to permit the compressed fluid within the chamber 27 to flow into the receiver through the pipe 28. The valves 25 and 26 may be of any preferred construction.

The connecting rod bearing 29 is lubricated by fluid lubricant supplied thereto through a passage 31 in a portion of the crank pin 21 which is supplied with fluid lubricant from a reciprocating pump. The fluid lubricant circulating pump comprises a hollow piston 32 that is pivotally mounted upon a crank pin 33 which is integral with crank pin 21 and which is eccentric to the center of rotation of the crank shaft 15, so that as the crank shaft 15 is rotated the piston 32 is reciprocated within a piston chamber 34 in a cylinder member 35 which is pivoted in a bearing 36 that is fixed to the casing section 5. The bearing 36 is provided with an intake opening 37 having a screen 38 extending there across for preventing foreign particles from flowing to the inlet opening 37. The inlet opening 37 registers with an opening 39 in a bore 41 within the cylinder member 35 which is open to the chamber 34, and the opening 39 is provided with a ball check valve 42 which serves to permit fluid lubricant to flow from the crank case into the bore 41, but which prevents a reflux of the fluid from the bore 41.

The piston 32 is provided with a longitudinal bore 43 which communicates with the passage 31 in the crank pin 33 and which is provided at its lower end with an inlet port 44 having a ball check valve 45. A pin 46 extending across the piston within the bore 43 serves to limit the upward movement of the ball check valve 45.

The cylinder member 35 is also provided with a piston chamber 48 containing a piston 49. Fluid lubricant is forced into the chamber 48 from the piston chamber 34 through bore 41, passage 51, past the ball check valve 52 in a valve chamber 53 and passage 54.

It is apparent from the foregoing, that when the crank shaft 15 is rotated, the piston 32 is reciprocated within the piston chamber 34 of the cylinder member 35 and that upon the upward stroke of the piston 32, fluid lubricant is drawn from the crank case chamber 8 through screen 38, passage 37, past the ball check valve 42, the ball check valve 45 in the piston being seated upon the upward stroke of the piston 32. Upon the downward stroke of the piston 32, the fluid lubricant drawn into the piston chamber 34 beneath the piston is forced through the passage 44, past the ball check valve 45 and into the passage 31, from whence it flows to the connecting rod bearing 29. Since there is no outlet for the fluid lubricant except through the clearance space of the bearing 29, the piston 32 compresses the fluid within the chamber 34 and forces it under pressure into the piston chamber 48 through the bore 41, passage 51, past the ball check valve 52 and passage 54, and the fluid under pressure acting on the left face of the piston 49 tends to move the piston 49 to the right position, as will hereinafter be explained.

The compressor is provided with an unloader device which comprises a ball check valve 55 contained within a valve chamber 56 in the closure casing 11, the valve being normally held unseated, when the compressor is at rest, by a fluted stem 57 which extends through a bore 58 and which is operated by a lever 59 that is mounted for oscillation upon a shaft 61 secured to the closure casing 11. A spring 62 within a recess 63 in the closure casing 11 engages the lower arm of the lever 59 and serves to yieldingly retain the lever 59 in the position shown in the drawing, wherein the lever and fluted stem 57 hold the ball check valve 55 in open position. A spring 64 within the valve chamber 56 tends to move the ball check valve 55 to closed position when the lever 59 is rotated in a counter-clockwise direction by the piston 49 which is provided with a stem 65 that engages the lower end of the lever 59.

The valve chamber 56 communicates with the compression chamber 27 above the piston 23 through a passage and pipe 66, check valve chamber 67 and passage 68 which is normally closed by a ball check valve 69 that is yieldingly retained against its seat by means of a spring 71. The operation of the unloader device will hereinafter appear.

The closure casing 11 is provided with a filling opening 72 that is normally closed by a hinged cap 73 which carries a check valve disc 74 upon a pin 75, the disc being adapted to seat upon an annular seat rib 76 and prevent air from flowing through the filling opening into the crank case. The valve disc 74 is adapted to be unseated when the pressure within the crank case chamber 8 exceeds atmospheric pressure and to thereby relieve the pressure within the crank case chamber. Upward movement of the valve disc 74 is limited by a seat rib 77 carried by the cap member 73.

In order to insure that fluid lubricant is supplied to the bearing chamber 13 when fluid lubricant is poured through the filling opening into the crank case, the casing 5 is provided with an arcuate flange 78 which forms an arcuate channel or groove 79 above the opening 9 in the casing 5, into which lubricant flows from the filling opening 72 through opening 81. The lubricant flowing into the groove 79 is conducted along a horizontal channel 82 formed in the side wall of the casing section 5 to the bearing chamber 13 through an opening 83. Consequently, when fluid lubricant is poured into the filling opening 72 it is conducted through passage 81, groove 79, groove 82, and passage 83 to the bearing chamber 13 from whence it overflows past the bearings 14 into the crank chamber 8.

A threaded gage opening 84 is provided in the closure section 11 and which is so disposed that when sufficient fluid lubricant has been supplied to the crank case, lubricant will flow from the gage opening. The gage opening is adapted to be closed by a threaded stopper 85 having a gage member 86 integral therewith and which extends into the crank chamber 8. The level of the fluid lubricant within the crank chamber may be determined by unscrewing the stopper 85 and observing the location of the oil on the gage member 86.

In operation, assuming the parts of the compressor to be in the position shown in Fig. 1, which they occupy when the compressor is at rest, and the ball check valve 55 of the unloader to be in the open position shown, initial operation of the compressor will simply cause the air drawn into the compression chamber 27 upon the downward or suction stroke to be forced, upon the upward or compression stroke of the piston, past the ball check valve 69 to the atmosphere through pipe 66, valve chamber 56, past the open ball valve 55, bore 58, crank case chamber 8, passage 81, filling opening 72, past the breather check valve disc 74, and through the passage 87 in the cap 73. The compressor will, therefore, remain unloaded so long as the ball check valve 55 is held open.

As the compressor continues to rotate with increased speed, reciprocation of the pump piston 32 will gradually cause the pressure of the fluid lubricant within the piston chamber 34 to increase, thereby increasing the pressure of the fluid lubricant acting on the left face of the piston 49. The movement of the piston 49 to the right is opposed by the tension of the spring 62, which tension is so selected that it prevents movement of the piston 49 until the compressor has attained a speed suitable for assuming the load.

When the compressor has attained the desired speed of operation, the pressure of the fluid lubricant acting on the piston 49 then forces it to the right against the tension of the spring 62, thereby causing counter-clockwise rotation of the lever 59 until it provides clearance between the lever and the fluted stem 57, at which time the check valve 55 is moved to close the bore 58 by the spring 64. With the check valve 55 closed, fluid under pressure can no longer flow to the atmosphere past the check valve 69 in the manner previously described, so that the fluid must be compressed and forced into the receiver through the pipe 28 in the usual manner.

In order to prevent the pressure within the lubricating system from becoming excessive, a port 91 is provided in the cylinder 47 which is uncovered by the piston 49 when the latter has moved to the right sufficiently to permit closure of the ball check valve 55 and fluid forced from the piston chamber 34 to the piston chamber 48 past the check valve 52 may then flow to the crank case chamber 8 through the port 91.

With the ball check valve 55 held closed by the spring 64 and the pressure within the chamber 56, the compressor is loaded and will remain loaded until such time as the compressor speed is reduced sufficiently to cause a reduction in the pressure of the fluid lubricant in the lubricating system, so that the spring 62 may force the piston 49 to the left and turn the lever 59 so as to unseat the check valve 55. From the foregoing it is apparent that the compressor is unloaded when the compressor is brought to rest or when, for any reason, the pressure of the lubricant in the lubricating system falls below a predetermined pressure.

With the ball check valve 55 in unseated position, the air compressed by the compressor piston 23 within the chamber 27 flows to the atmosphere past the ball check valve 69, in the manner above described. The ball check valve 69 is located immediately adjacent the compression chamber 27, so that the clearance of the unloader is limited to that of the short passage 68 when the ball check valve is held closed by the spring 71 and the pressure of the fluid in pipe 66 and when the ball check valve 55 is closed, as when the compressor is loaded.

While but one embodiment of the invention is herein disclosed, it is obvious that additions, omissions and other changes may be made in the construction without departing from the spirit of the invention.

Having now described my invention, what I claim as new and desire to secure by Letters Patent, is:

1. The combination with a compressor, of an unloader comprising a check valve controlling communication from a chamber in which fluid is compressed to the atmosphere, means normally yieldingly holding said check valve in closed position, yielding means for holding said check valve open, a pump actuated by the compressor for circulating fluid lubricant under pressure in said system and a movable abutment actuated by fluid lubricant in said system for rendering said yielding means ineffective to hold said check valve open.

2. The combination with a compressor, of an unloader comprising a valve controlling communication from a chamber, in which fluid is compressed, to the atmosphere, means normally yieldingly holding said valve in closed position, yielding means for holding said valve open, a pump actuated by the compressor for circulating fluid lubricant under pressure, a movable abutment actuated by the pressure of fluid lubricant circulated by the pump for rendering said yielding means ineffective to hold said valve open, and means controlled by said abutment for regulating the pressure of the lubricant circulated by said pump.

3. A fluid compressor comprising a casing having a compression chamber and a crank case chamber, an unloading communication leading from the compression chamber through said crank case chamber to the atmosphere, a valve for controlling said communication, yielding means for holding said valve in closed position, a second yielding means for holding said valve in open position in opposition to said first yielding means, and pressure responsive means for rendering said second yielding means ineffective to hold said valve in open position.

4. A fluid compressor comprising a casing having a compression chamber and a crank case chamber, an unloading communication leading from the compression chamber through said crank case chamber to the atmosphere, a check valve adapted to permit flow of fluid under pressure through said communication from said crank case chamber to the atmosphere and to prevent flow of fluid therepast in the opposite direction, a valve for controlling said communication, yielding means for holding said valve in closed position, a second yielding means for holding said valve in open position in opposition to said first yielding means, and pressure responsive means for rendering said second yielding means ineffective to hold said valve in open position.

5. A fluid compressor comprising a casing having a compression chamber and a crank case chamber, a check valve adapted to permit the flow of fluid under pressure from the said crank case chamber to the atmosphere but preventing reverse flow therepast, a communication for the flow of fluid under pressure from the said compression chamber to said crank case chamber, a valve for controlling the flow of fluid under pressure through said communication from the said compression chamber to the said crank case chamber, yielding means for holding said valve in closed position, means including a second yielding means for holding said valve in open position in opposition to said first yielding means, and pressure responsive means for rendering said means ineffective to hold said valve in open position when the pressure acting on said pressure responsive means exceeds a predetermined valve.

6. A fluid compressor comprising a casing having a compression chamber and a crank case chamber, a check valve adapted to permit the flow of fluid under pressure from the said crank case chamber to the atmosphere but preventing reverse flow therepast, a communication for the flow of fluid under pressure from the said compression chamber to said crank case chamber, a valve for controlling the flow of fluid under pressure through said communication from the said compression chamber to the said crank case chamber, yielding means for holding said valve in closed position, means including a second yielding means for holding said valve in open position in opposition to said first yielding means, and pressure responsive means controlled by the speed of the compressor for rendering said means ineffective to hold said valve in open position when the speed of the compressor exceeds a predetermined value.

7. A fluid compressor comprising a casing having a compression chamber and a crank case chamber, a check valve adapted to permit the flow of fluid under pressure from the said crank case chamber to the atmosphere but preventing reverse flow therepast, a communication for the flow of fluid under pressure from the said compression chamber to said crank case chamber, a valve for controlling the flow of fluid under pressure through said communication from the said compression chamber to the said crank case chamber, yielding means for holding said valve in closed position, an operating lever within said crank case chamber adapted to move the said valve to open position, a second yielding means adapted to cause said lever to move said valve to and hold it in open position in opposition to said first yielding means, and pressure responsive means within the crank case chamber adapted to oppose the movement of said operating lever by said second yielding means and render it ineffective to hold said valve in open position.

8. A fluid compressor comprising a casing having a compression chamber and a crank case chamber communicating with the atmosphere, a conduit for establishing a communication from said compression chamber to said crank case chamber whereby said compressor may be unloaded, a check valve in said communication adjacent said compression chamber adapted to permit flow of fluid under pressure from said compression chamber into said conduit and to prevent reverse flow therepast, a valve in said communication for controlling the flow of fluid under pressure therethrough, yielding means for holding said valve in closed position, a second yielding means for holding said valve in open position in opposition to said first yielding means, and pressure responsive means for rendering said second yielding means ineffective to hold said valve in open position when the pressure acting on said pressure responsive means exceeds a predetermined value.

9. A fluid compressor comprising a casing having a compression chamber and a crank case chamber, said crank case chamber being open at one face thereof, a casing section secured to said casing and closing the open face of said crank case chamber, an unloading valve mounted in said casing section and controlling communication from said compression chamber to said crank case chamber, and means for operating said valve.

10. A fluid compressor comprising a casing having a compression chamber and a crank case chamber, said crank case chamber being open at one face thereof, a casing section secured to said casing and closing the open face of said crank case chamber, an unloading valve mounted in said casing section and controlling communication from said compression chamber to said crank case chamber, and an operating lever pivotally mounted within said casing section for operating said valve.

11. A fluid compressor comprising a casing having a compression chamber and a crank case chamber, said crank case chamber being open at one face thereof, a casing section secured to said casing and closing the open face of said crank case chamber, an unloading valve mounted in said casing section and controlling communication from said compression chamber to said crank case chamber, means for operating said valve, and a check valve mounted in said casing section adapted to permit the flow of fluid under pressure from said crank case chamber to the atmosphere and preventing reverse flow of fluid therepast.

12. A fluid compressor comprising a casing having a compression chamber and a crank case chamber, said crank case chamber being open at one face thereof, a casing section secured to said casing and closing the open face of said crank case chamber, said casing section having an opening therein through which fluid lubricant may be poured into the said crank case chamber, an unloading valve mounted in said casing section and controlling communication from said compression chamber to said crank case chamber, means for operating said valve, and a check valve, removably disposed in the opening in said casing section through which fluid lubricant may be poured into the crank case chamber, said check valve being adapted to permit the flow of fluid under pressure from said crank case chamber to the atmosphere and preventing reverse flow of fluid therepast.

PHILIP L. CRITTENDEN.

CERTIFICATE OF CORRECTION.

Patent No. 2,017,684.  October 15, 1935.

PHILIP L. CRITTENDEN.

It is hereby certified that error appears in the printed specification of the above numbered patent requiring correction as follows: Page 3, first column, line 56, beginning with the numeral and word "1. The" strike out all to and including the word and period "open." in line 67, comprising claim 1; and for the claim numbers "2, 3, 4, 5, 6, 7, 8, 9, 10, 11 and 12" read 1, 2, 3, 4, 5, 6, 7, 8, 9, 10 and 11, respectively; page 3, second column, line 53, claim 5, for "valve" read value; and that the said Letters Patent should be read with these corrections therein that the same may conform to the record of the case in the Patent Office.

Signed and sealed this 14th day of January, A. D. 1936.

Leslie Frazer (Seal) Acting Commissioner of Patents.